United States Patent
Someya et al.

(10) Patent No.: US 7,092,215 B2
(45) Date of Patent: Aug. 15, 2006

(54) DISC DRIVE SUSPENSION INCLUDING A WIRED FLEXURE WITH CONDUCTORS ARRANGED TO REDUCE CROSSTALK

(75) Inventors: Ikuo Someya, Sagamihara (JP); Ichiro Takadera, Tokyo (JP); Hajime Arai, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 366 days.

(21) Appl. No.: 10/681,088

(22) Filed: Oct. 7, 2003

(65) Prior Publication Data
US 2004/0070884 A1    Apr. 15, 2004

(30) Foreign Application Priority Data
Oct. 9, 2002    (JP) ............................... 2002-296306

(51) Int. Cl.
G11B 21/16    (2006.01)
G11B 5/54    (2006.01)

(52) U.S. Cl. ...................................................... 360/246
(58) Field of Classification Search ................ 360/246, 360/245.9, 245.8, 244, 240, 264.2, 266.3
See application file for complete search history.

(56) References Cited

U.S. PATENT DOCUMENTS 5,796,552 A    8/1998    Akin, Jr. et al. ......... 360/264.2
6,608,736 B1 *    8/2003    Klaassen et al. ............ 360/246

OTHER PUBLICATIONS

Chen et al, Sep. 1994, IEEE Trans. Mag. v. 30 No. 5 pp. 2818-2820.*

* cited by examiner

Primary Examiner—Julie Anne Watko
(74) Attorney, Agent, or Firm—Frishauf, Holtz, Goodman & Chick, P.C.

(57) ABSTRACT

A wiring portion has first and second write conductors, first and second read conductors, and an insulating layer. The first write conductor, first and second read conductors, and second write conductor are arranged three-dimensionally at different height levels in the thickness direction of the insulating layer, in a cross section extending in the width direction of the wiring portion. The distance from the first write conductor to the first read conductor is equal to the distance from the first write conductor to the second read conductor. The distance from the second write conductor to the first read conductor is equal to the distance from the second write conductor to the second read conductor.

4 Claims, 5 Drawing Sheets

DISC DRIVE SUSPENSION INCLUDING A WIRED FLEXURE WITH CONDUCTORS ARRANGED TO REDUCE CROSSTALK

CROSS-REFERENCE TO RELATED APPLICATIONS

This application is based upon and claims the benefit of priority from the prior Japanese Patent Application No. 2002-296306, filed Oct. 9, 2002, the entire contents of which are incorporated herein by reference.

BACKGROUND OF THE INVENTION

1. Field of the Invention

The present invention relates to a disc drive suspension incorporated in an information processor, such as a personal computer.

2. Description of the Related Art

A hard disc drive (HDD) that is used to record in or read data from a rotating disc has a disc drive suspension on the distal end portion of an actuator arm. A head section that includes a slider is provided on the distal end portion of the suspension. When the disc rotates, the slider slightly lifts above the surface of the disc, whereupon an air bearing is formed between the disc and the slider.

The disc drive suspension comprises a load beam section, a flexure fixed thereon, etc. The slider is mounted on the distal end of the flexure. There are flexures of various forms that are based on required specifications. One such flexure is described in U.S. Pat. No. 5,796,552.

A wiring portion 1 of a conventional wired flexure shown in FIG. 10 includes a metal base 2 formed of a thin stainless-steel sheet, an insulating layer 3 formed of polyimide on the metal base 2, a pair of write conductors W1 and W2 and a pair of read conductors R1 and R2 extending along the insulating layer 3, etc. The respective one ends of the write conductors W1 and W2 and the read conductors R1 and R2 are connected electrically to terminals (e.g., MR element terminals) of the slider. The respective other ends of the write conductors W1 and W2 and the read conductors R1 and R2 are connected electrically to write and read electric circuits (not shown).

As write current flows through the write conductors W1 and W2, some of its energy may possibly be induced in the read conductors R1 and R2. As shown in FIG. 10, for example, an electric or magnetic field (indicated by electric force lines F) that is generated in the write conductors W1 and W2 exerts a greater influence on the read conductor R1 that is located closer to the write conductors W1 and W2 than on the other read conductor R2. Thus, a greater induced electromotive force is generated in the one read conductor R1 than in the other read conductor R2, so that a potential difference is caused between the read conductors R1 and R2.

The potential difference arouses the problem of cross talk. Depending on its level, cross talk may deteriorate or even ruin an MR element of the head section and the like. With the increase of the recording density of modern discs, in particular, the head section is liable to be susceptible to cross talk. Therefore, cross talk should be minimized.

The difference between the influences of the electric or magnetic field in the write conductors W1 and W2 on the read conductors R1 and R2 can be reduced by increasing a distance S from the write conductors W1 and W2 to the read conductors R1 and R2. Thus, if the distance S can be increased, influences of the write conductors W1 and W2 on the read conductors R1 and R2 are reduced, so that the difference in potential between the read conductors R1 and R2 is lessened.

However, the wiring portion 1 is restricted in size and its width is expected to be reduced these days, in particular, so that it is hard to increase the distance S. In the disc drive suspension of which the wiring portion must be narrowed, therefore, the cross talk characteristic sometimes must inevitably be neglected in some measure.

BRIEF SUMMARY OF THE INVENTION

Accordingly, the object of the present invention is to provide a disc drive suspension capable of reducing cross talk.

According to the invention, there is provided a disc drive suspension which comprises a wiring portion. The wiring portion has first and second write conductors paired with each other, first and second read conductors paired with each other, and an insulating layer for electrically insulating the first and second write conductors from the first and second read conductors. At least some of the conductors are arranged at different height levels in the thickness direction of the insulating layer so that the distance from the first write conductor to the first read conductor, in a cross section extending in the width direction of the wiring portion, corresponds to the distance from the first write conductor to the second read conductor and that the distance from the second write conductor to the first read conductor corresponds to the distance from the second write conductor to the second read conductor. According to this arrangement, cross talk can be reduced without increasing the distances between the write conductors and the read conductors.

"The distance from the first write conductor to the first read conductor corresponds to the distance from the first write conductor to the second read conductor" described herein implies that an electric or magnetic field that is generated as current is supplied to the first write conductor acts substantially equally on the first and second read conductors. In other words, the corresponding distances are distances such that a difference in potential between the first and second read conductors caused when the current is supplied to the first write conductor can be lessened to a practically negligible level.

Likewise, "the distance from the second write conductor to the first read conductor corresponds to the distance from the second write conductor to the second read conductor" implies that an electric or magnetic field that is generated as current is supplied to the second write conductor acts substantially equally on the first and second read conductors. In other words, the corresponding distances are distances such that a difference in potential between the first and second read conductors caused when the current is supplied to the second write conductor can be lessened to a practically negligible level.

Preferably, the insulating layer is formed on a wired flexure extending along the load beam, and the first and second write conductors and the first and second read conductors are arranged along the insulating layer. According to this arrangement, cross talk can be reduced in the disc drive suspension having the wired flexure.

Preferably, the first and second write conductors face each other in the thickness direction of the insulating layer across the insulating layer, and the first and second read conductors are arranged in the width direction of the insulating layer so as to be symmetrical with respect to a segment connecting the first and second write conductors. According to this arrangement, the difference in potential between the first and second read conductors can be lessened, so that cross talk can be reduced.

Preferably, the first write conductor and the first read conductor are arranged on a first surface extending in the width direction of the insulating layer, the second write conductor and the second read conductor are arranged on a second surface extending in the width direction of the insulating layer, the first write conductor and the second read conductor face each other in the thickness direction of the insulating layer, and the second write conductor and the first read conductor face each other in the thickness direction of the insulating layer. According to this arrangement, the distance from the first write conductor to the first read conductor and the distance from the first write conductor to the second read conductor can be equalized, and the distance from the second write conductor to the first read conductor and the distance from the second write conductor to the second read conductor can be equalized. Thus, cross talk can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
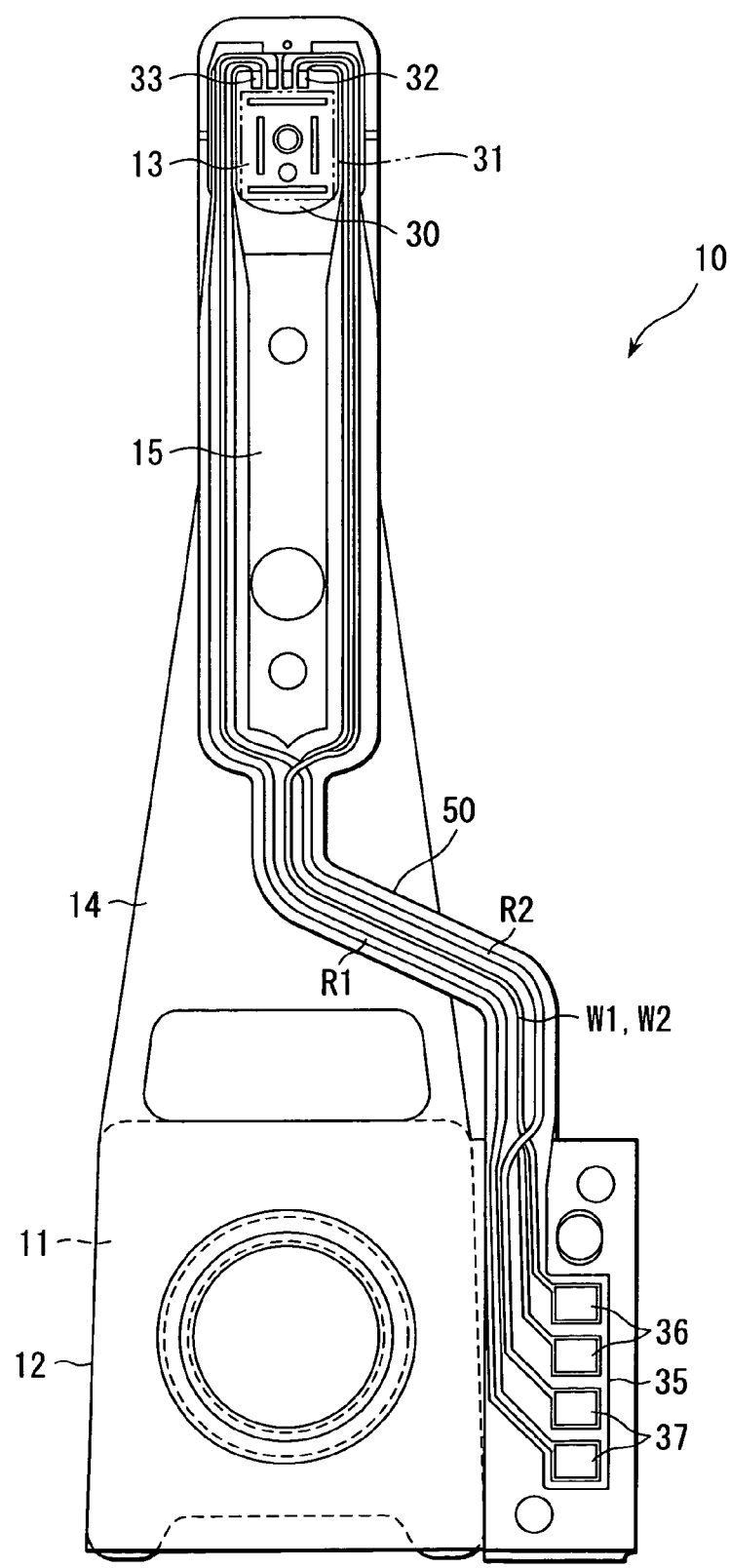
FIG. 1 is a plan view of a disc drive suspension according to a first embodiment of the invention.

A first embodiment of the present invention will now be described with reference to FIGS. 1 to 4. A disc drive suspension 10 shown in FIG. 1 comprises a base section 12 including a baseplate 11, a head section 13, a load beam 14 extending from the base section 12 toward the head section 13, a flexure 15 extending along the load beam 14, etc. The base section 12 is fixed to an actuator arm (not shown) of a disc drive.

Figure 2:
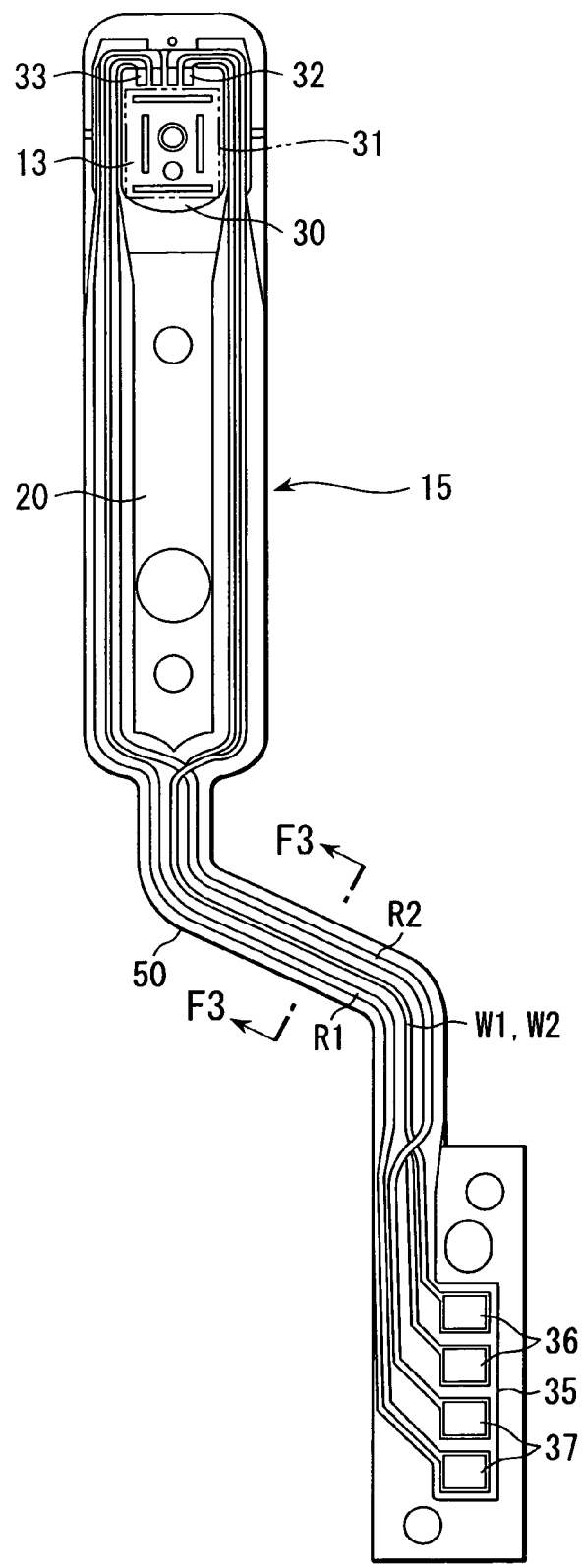
FIG. 2 is a plan view of a wired flexure of the disc drive suspension shown in FIG. 1.

FIG. 2 shows the flexure 15 of the suspension 10. The flexure 15 is provided with a metal base 20. The metal base 20 is formed of a springy electrically conductive material (e.g., rolled stainless steel), and is about 20 µm thick, for example.

Figure 3:
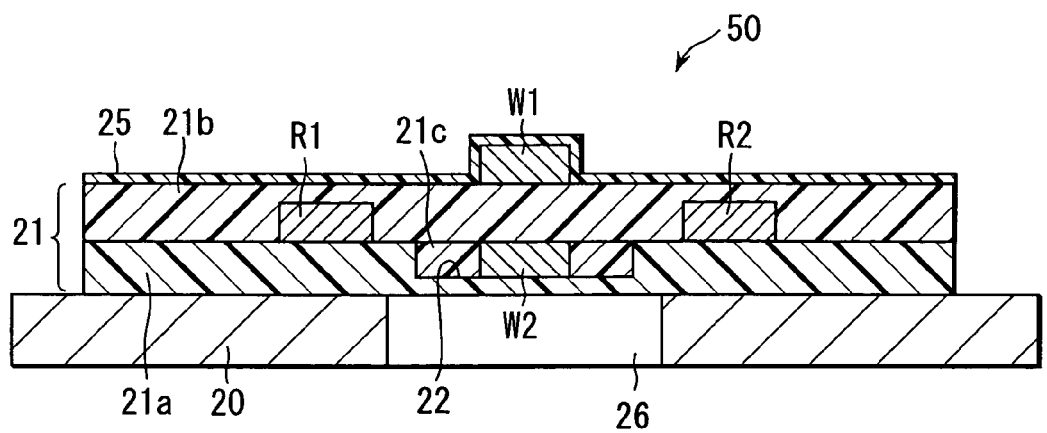
FIG. 3 is a sectional view of a wiring portion of the wired flexure taken along line F3—F3 of FIG. 2.

As shown in FIG. 3, an insulating layer 21 of an electrical insulating material such as polyimide is formed on the metal base 20. A pair of write conductors W1 and W2 and a pair of read conductors R1 and R2 are arranged extending along the insulating layer 21. These conductors W1, W2, R1 and R2 are formed of an electrically conductive material such as copper. They are formed into desired patterns by etching a thin copper sheet, forming a copper layer by plating, etc.

The insulating layer 21 of this embodiment is composed of a first layer 21a put on the metal base 20, a second layer 21b formed on the first layer 21a, an intermediate layer 21c in a depression 22 formed in the first layer 21a, etc.

The first write conductor W1 is formed on the second layer 21b and is covered by a cover layer 25 that is formed of a resin such as polyimide. Both the read conductors R1 and R2 are formed on the first layer 21a. The second write conductor W2 is formed inside the depression 22.

Openings 26 are formed in a suitable position in the metal base 20 in order to regulate the respective impedances of the conductors W1, W2, R1 and R2 or adjust the flexural rigidity of the metal base 20. The cross section of each of the conductors W1, W2, R1 and R2 is not limited to an oblong shape and may alternatively be square.

As shown in FIGS. 1 and 2, a tongue portion 30 that can bend in its thickness direction is formed on the distal end portion of the metal base 20. The tongue portion 30 is fitted with a slider 31 (indicated by two-dot chain line) that constitutes the head section 13.

The slider 31 is provided with a galvano-electric transducer, such as an MR (magneto-resistive) element, which can convert electric signals into magnetic signals and vice versa. An electric signal that is used to record data in a disc is transmitted from a write circuit to the galvano-electric transducer or MR element through the write conductors W1 and W2. In reading data from the disc, data read by means of the galvano-electric transducer are converted into electric signals and transmitted to a data processor through the read conductors R1 and R2.

The respective first ends of the write conductors W1 and W2 and the read conductors R1 and R2 are connected to their corresponding terminals 32 and 33 on the head section 13. The respective other ends of the write conductors W1 and W2 and the read conductors R1 and R2 are connected to their corresponding terminals 36 and 37 on a connecting pad 35 of the flexure 15.

The flexure 15 has a wiring portion 50 in which the write conductors W1 and W2 and the read conductors R1 and R2 closely adjoin one another in parallel relation. Thus, the flexure 15 is a wired flexure that has the wiring portion 50.

In a width-direction profile of the wiring portion 50, as shown in FIG. 3, the first write conductor W1, the first and second read conductors R1 and R2, and the second write conductor W2 are arranged three-dimensionally so that their respective height levels in the thickness direction of the insulating layer 21 are different.

Figure 4:
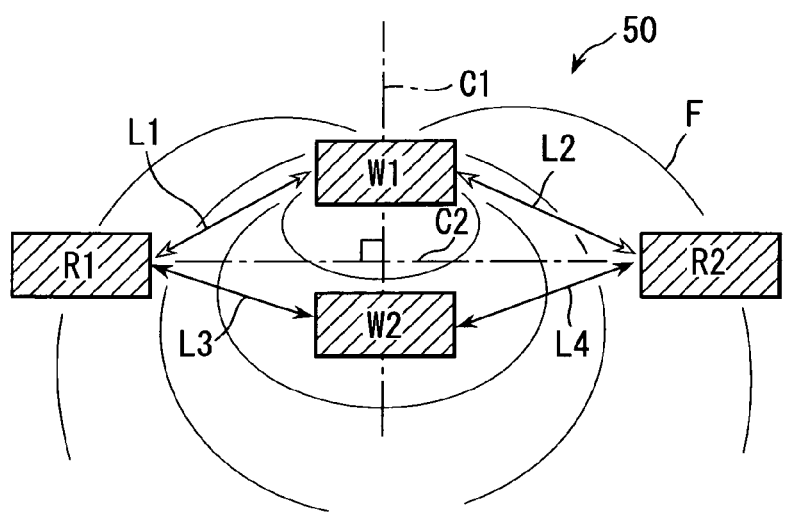
FIG. 4 is a sectional view illustrating relations between electric force lines and write and read conductors of the wiring portion shown in FIG. 3.

More specifically, as shown in FIG. 4, a distance L1 from the first write conductor W1 to the first read conductor R1 is substantially equal to a distance L2 from the first write conductor W1 to the second read conductor R2. Further, a distance L3 from the second write conductor W2 to the first read conductor R1 is substantially equal to a distance L4 from the second write conductor W2 to the second read conductor R2.

The first and second write conductors W1 and W2 face each other in the thickness direction with the second layer 21b of the insulating layer 21 between them. The first and second read conductors R1 and R2 are arranged in the width direction of the insulating layer 21 so that they are symmetrical with respect to a segment C1 (shown in FIG. 4) that connects the first and second write conductors W1 and W2.

The following is a description of the function of the wiring portion 50 arranged in this manner.

If the first and second write conductors W1 and W2 are driven differentially, electric force lines F (shown in FIG. 4) advance from the one write conductor W1, which is driven on the electrically positive side, toward the other write conductor W2, which is driven on the negative side. As this is done, some of the electric force lines F interfere with the read conductors R1 and R2, whereupon electromotive forces are generated in the conductors R1 and R2, based on the principle of electrostatic induction.

In the wiring portion 50, however, the first and second write conductors W1 and W2 and the first and second read conductors R1 and R2 are arranged geometrically symmetrically. Therefore, equal potentials are induced individually in the read conductors R1 and R2, so that cross talk cannot be caused by a potential difference.

For magnetic flux, the electromotive forces that are generated as the write conductors W1 and W2 are driven differentially are also induced in the first and second read conductors R1 and R2. Since the electromotive forces for the read conductors R1 and R2 are equal in magnitude, however, generation of cross talk can be restrained.

Thus, according to the wiring portion 50 of the embodiment described above, an electric or magnetic field that is generated as the write conductors W1 and W2 are driven acts equally on the first and second read conductors R1 and R2. Therefore, only common-mode noises of the same amplitude and phase for the ground are excited in the read conductors R1 and R2. These noises cannot be converted into normal-mode noises that exert a bad influence upon the head section 13 unless the differential drive of the read conductors R1 and R2 is unbalanced.

In the wiring portion 50, the distances L1 and L2 from the first write conductor W1 to the read conductors R1 and R2 are substantially equal to the distances L3 and L4 from the second write conductor W2 to the read conductors R1 and R2. Besides, the segment C1 that connects the write conductors W1 and W2 and a segment C2 that connects the read conductors R1 and R2 extend at right angles to each other substantially at the respective midpoints of the segments C1 and C2. Thus, the conductors W1, W2, R1 and R2 are geometrically balanced, so that the wiring portion 50 can serve more effectively for the reduction of cross talk.

Figure 5:
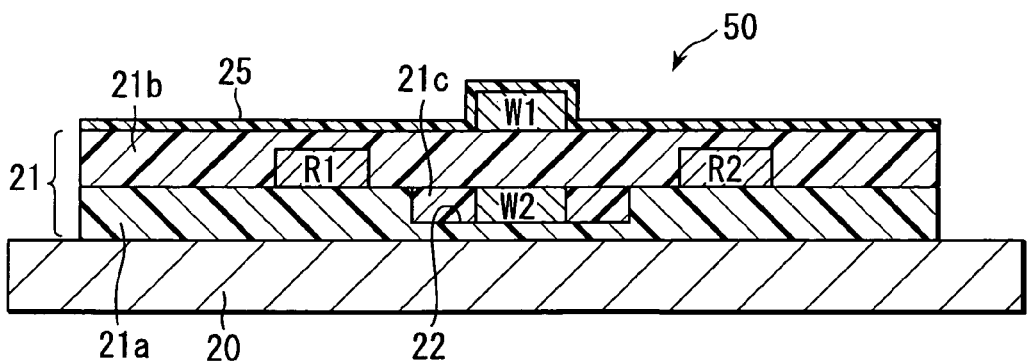
FIG. 5 is a sectional view of a wiring portion of a disc drive suspension according to a second embodiment of the invention.

FIG. 5 shows a wiring portion 50 according to a second embodiment of the invention. This wiring portion 50 differs from wiring portion 50 of the first embodiment in that no hole for impedance adjustment is formed in the metal base 20. However, it shares other configurations and functions with the wiring portion 50 of the first embodiment.

Figure 6:
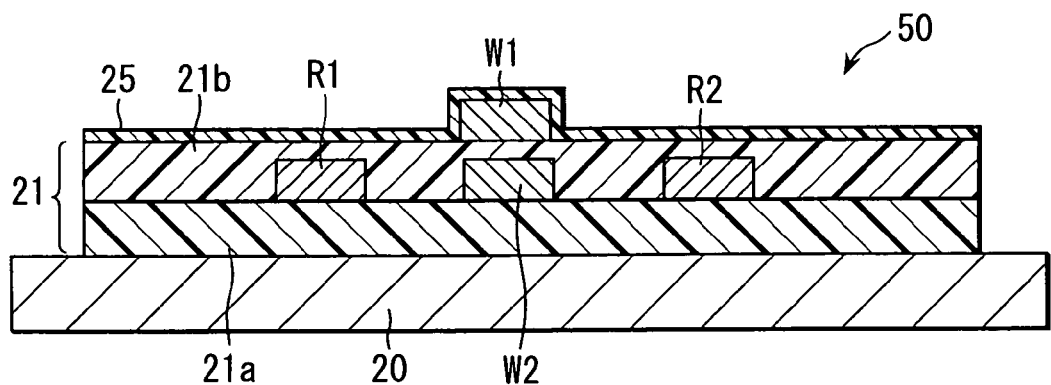
FIG. 6 is a sectional view of a wiring portion of a disc drive suspension according to a third embodiment of the invention.

FIG. 6 shows a wiring portion 50 according to a third embodiment of the invention. In this wiring portion 50, first and second read conductors R1 and R2 and a second write conductor W2 are formed on a first layer 21a of an insulating layer 21, and a first write conductor W1 on a second layer 21b. The wiring portion 50 of the third embodiment shares other configurations and functions with the wiring portion 50 of the first embodiment. The wiring portion 50 of this embodiment is also provided with a cover layer 25. The same applies to the following embodiments.

Figure 7:
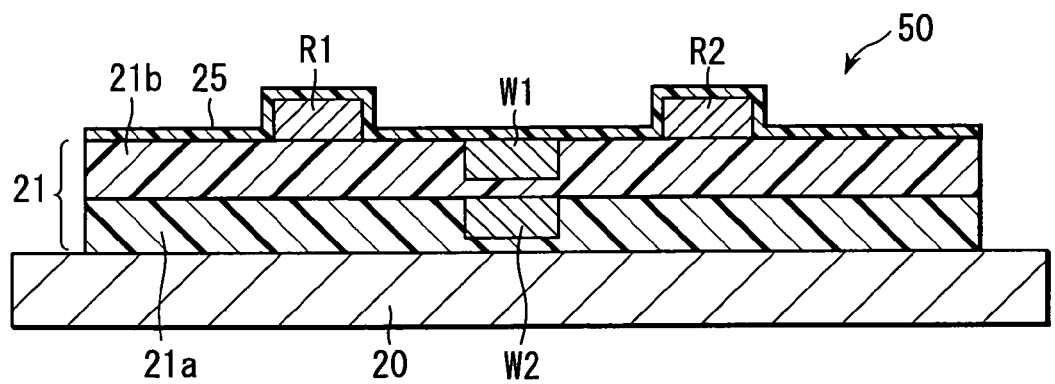
FIG. 7 is a sectional view of a wiring portion of a disc drive suspension according to a fourth embodiment of the invention.

FIG. 7 shows a wiring portion 50 according to a fourth embodiment of the invention. In this wiring portion 50, a second write conductor W2 is provided on a first layer 21a of an insulating layer 21, and a first write conductor W1 on a second layer 21b. First and second read conductors R1 and R2 are formed on a second layer 21b. The wiring portion 50 of the fourth embodiment shares other configurations and functions with the wiring portion 50 of the first embodiment.

Figure 8:
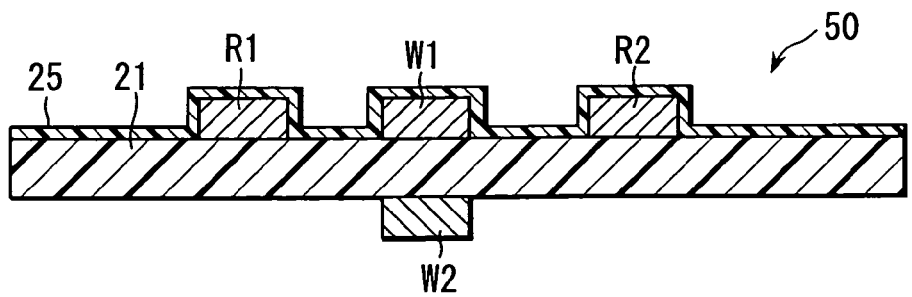
FIG. 8 is a sectional view of a wiring portion of a disc drive suspension according to a fifth embodiment of the invention.

FIG. 8 shows a wiring portion 50 according to a fifth embodiment of the invention. This wiring portion 50 is not provided with any metal base. In this wiring portion 50, a first write conductor W1 and first and second read conductors R1 and R2 are formed on one surface of an insulating layer 21, and a second write conductor W2 on the other surface of the layer 21. The wiring portion 50 of the fifth embodiment shares other configurations and functions with the wiring portion 50 of the first embodiment.

Figure 9:
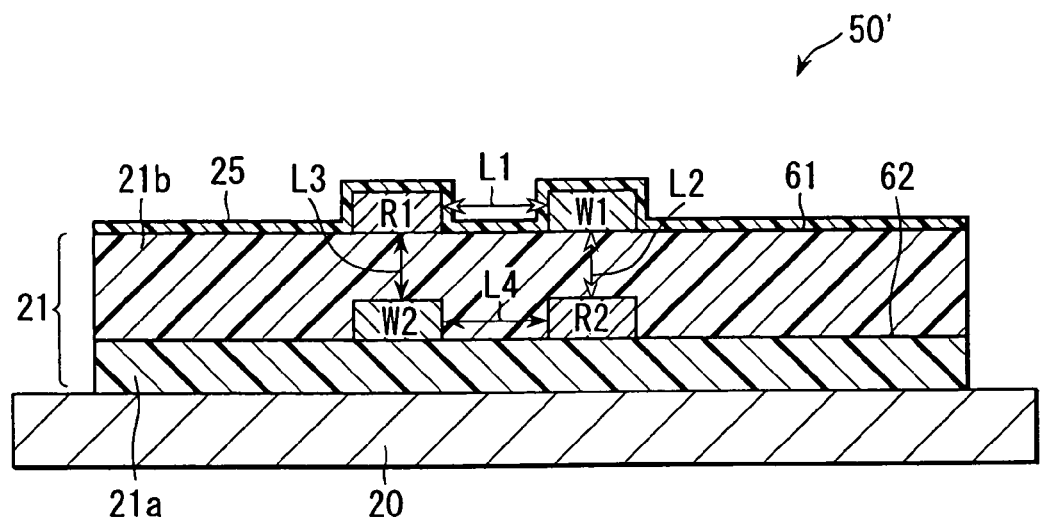
FIG. 9 is a sectional view of a wiring portion of a disc drive suspension according to a sixth embodiment of the invention.
Figure 10:
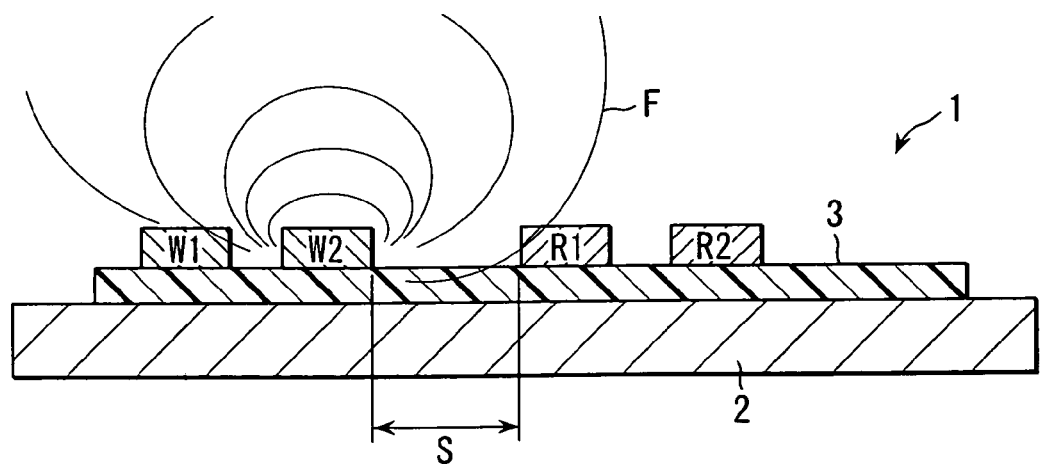
FIG. 10 is a sectional view showing a conventional wiring portion.

FIG. 9 shows a wiring portion 50' according to a sixth embodiment of the invention. In this wiring portion 50', a first write conductor W1 and a first read conductor R1 are arranged on a first surface 61 that extends in the width direction of a second layer 21b of an insulating layer 21. A second write conductor W2 and a second read conductor R2 are arranged on a second surface 62 that extends in the width direction of a first layer 21a. The first write conductor W1 and the second read conductor R2 face each other in the thickness direction of the insulating layer 21, and the second write conductor W2 and the first read conductor R1 face each other in the thickness direction of the insulating layer 21.

In this wiring portion 50' constructed in this manner, the distance L1 from the first write conductor W1 to the first read conductor R1 can be also equalized to the distance L2 from the first write conductor W1 to the second read conductor R2. Further, the distance L3 from the second write conductor W2 to the first read conductor R1 can be equalized to the distance L4 from the second write conductor W2 to the second read conductor R2. As current flows through the write conductors W1 and W2, therefore, a difference in potential between the read conductors R1 and R2 can be suppressed, so that cross talk can be reduced. The wiring portion 50' of the sixth embodiment shares other configurations and functions with the wiring portion 50 of the first embodiment.

It is to be understood, in carrying out the present invention based on these embodiments, that the components of the invention, including the respective forms of the insulating layer, write conductors, and read conductors that constitute the wiring portion, may be changed or modified variously without departing from the scope or spirit of the invention. The invention is also applicable to any other wiring portion than a flexure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:
a load beam;
a head section which writes and reads data; and
a wiring portion connected electrically to the head section;
wherein the wiring portion comprises first and second write conductors paired with each other, first and second read conductors paired with each other, and an insulating layer for electrically insulating the first and second write conductors from the first and second read conductors;
wherein at least some of the conductors are arranged at a different height level in a thickness direction of the insulating layer with respect to at least one other of the conductors such that, in a cross section taken along a width direction of the wiring portion, a distance from the first write conductor to the first read conductor corresponds to a distance from the first write conductor to the second read conductor and such that a distance from the second write conductor to the first read conductor corresponds to a distance from the second write conductor to the second read conductor; and
wherein the first and second write conductors face each other along a thickness direction of the insulating layer across the insulating layer, and the first and second read conductors are arranged along a width direction of the insulating layer so as to be symmetrical with respect to a line segment connecting the first and second write conductors.

2. The disc drive suspension according to claim 1, wherein the insulating layer is formed on a wired flexure extending along the load beam, and the first and second write conductors and the first and second read conductors are arranged along the insulating layer.

3. A disc drive suspension comprising:
a load beam;
a head section which writes and reads data; and
a wiring portion connected electrically to the head section;
wherein the wiring portion comprises first and second write conductors paired with each other, first and second read conductors paired with each other, and an insulating layer for electrically insulating the first and second write conductors from the first and second read conductors;
wherein at least some of the conductors are arranged at a different height level in a thickness direction of the insulating layer with respect to at least one other of the conductors such that, in a cross section taken along a width direction of the wiring portion, a distance from the first write conductor to the first read conductor corresponds to a distance from the first write conductor to the second read conductor and such that a distance from the second write conductor to the first read conductor corresponds to a distance from the second write conductor to the second read conductor; and
wherein the first write conductor and the first read conductor are arranged on a first surface extending in a width direction of the insulating layer, the second write conductor and the second read conductor are arranged on a second surface extending in the width direction of the insulating layer, the first write conductor and the second read conductor face each other along a thickness direction of the insulating layer, and the second write conductor and the first read conductor face each other along the thickness direction of the insulating layer.

4. The disc drive suspension according to claim 3, wherein the insulating layer is formed on a wired flexure extending along the load beam, and the first and second write conductors and the first and second read conductors are arranged along the insulating layer.

* * * * *